(No Model.) 2 Sheets—Sheet 1.

L. E. DICKINSON.
Mechanical Movement.

No. 243,526. Patented June 28, 1881.

(No Model.) 2 Sheets—Sheet 2.

L. E. DICKINSON.
Mechanical Movement.

No. 243,526. Patented June 28, 1881.

Witnesses
Otto Hufeland
William Miller

Inventor
Levi E. Dickinson
by Van Santvoord & Hauff
his att'ys

UNITED STATES PATENT OFFICE.

LEVI E. DICKINSON, OF AMHERST, MASSACHUSETTS.

MECHANICAL MOVEMENT.

SPECIFICATION forming part of Letters Patent No. 243,526, dated June 28, 1881.

Application filed May 25, 1881. (No model.)

*To all whom it may concern:*

Be it known that I, LEVI E. DICKINSON, a citizen of the United States, residing at Amherst, in the county of Hampshire and State of Massachusetts, have invented new and useful Improvements in Mechanical Movements, of which the following is a specification.

This invention consists in the combination, with a revolving shaft, of a primary friction-wheel firmly mounted on said shaft, a secondary friction-wheel mounted in a movable bearing and pressed against the primary friction-wheel by a spring or weight, a driven shaft mounted in a movable bearing, a pulley mounted on the driven shaft, and a suitable contact mechanism for moving this pulley up against the friction-wheels, so that when a comparatively small force is applied to this contact mechanism the driven shaft revolves in one direction by contact with the secondary friction-wheel, and when the force which acts on the contact mechanism is increased the secondary friction-wheel is moved out of contact with the primary friction-wheel and the driven shaft is caused to revolve in the opposite direction by the action of the primary friction-wheel on the pulley.

Figure 1:
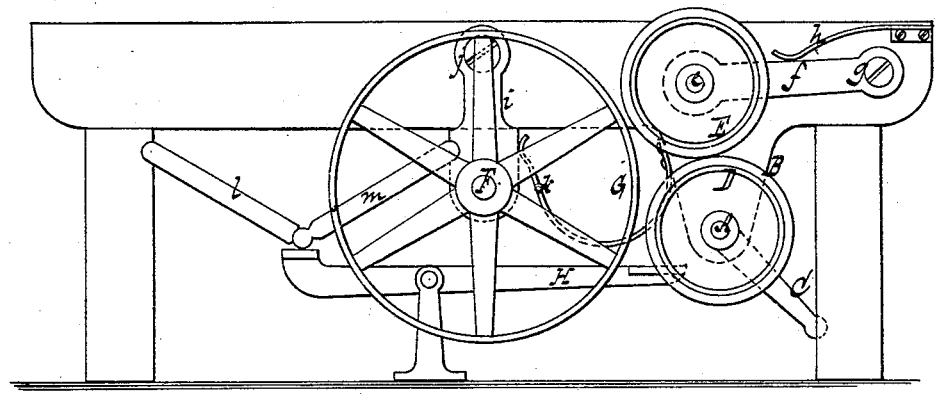
Figure 2:
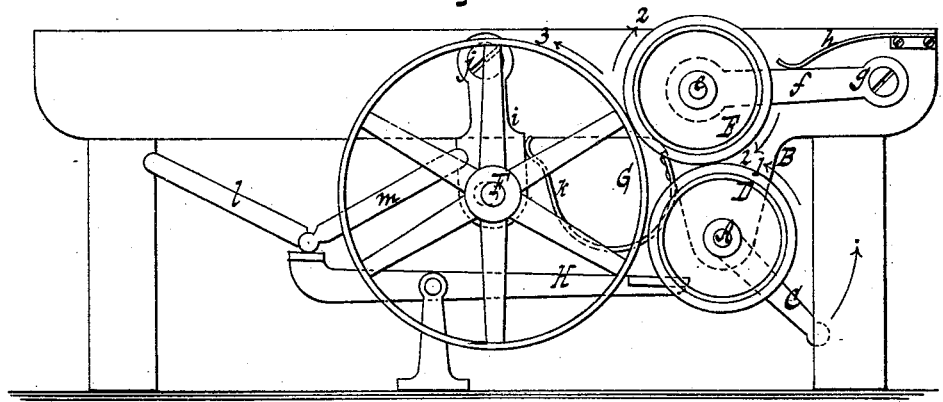
Figure 3:
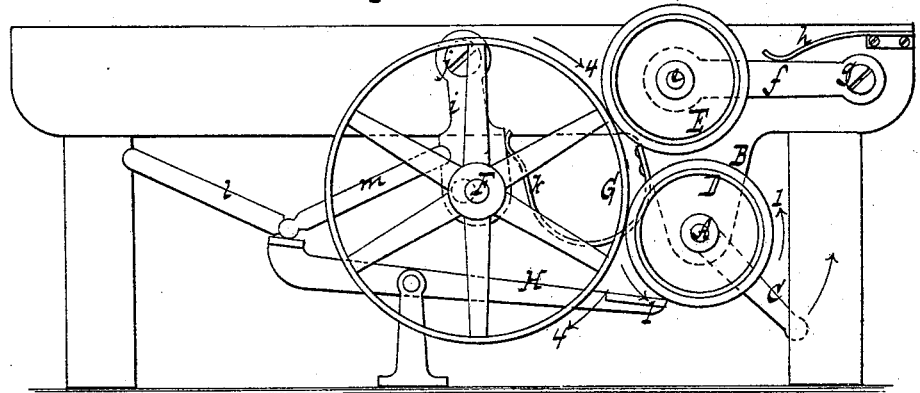
Figure 4:
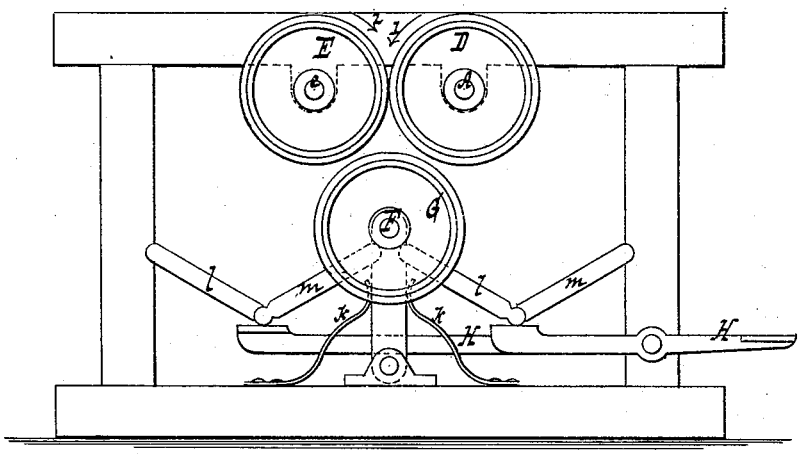
Figure 5:
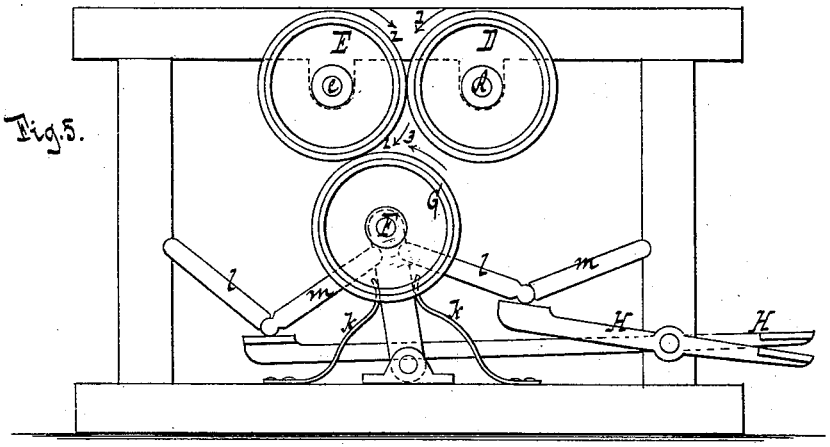
Figure 6:
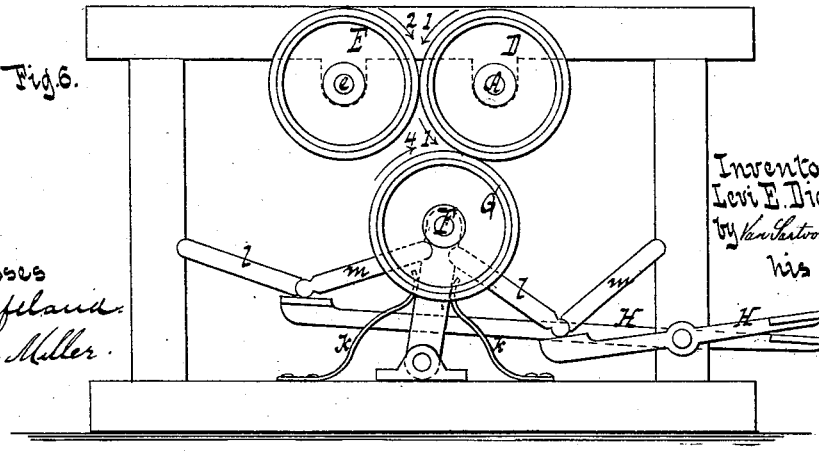

This invention is illustrated in the accompanying drawings, in which Figure 1 represents a front view of my mechanism when the pulley is out of contact with both friction-wheels and no motion is imparted to the driven shaft. Fig. 2 is a similar view when the pulley is in contact with the secondary friction-wheel. Fig. 3 is a similar view when the pulley is in contact with the primary friction-wheel. Figs. 4, 5, and 6 are corresponding views of a modification.

Similar letters indicate corresponding parts.

In the drawings, the letter A designates a shaft, which is mounted in a fixed bearing, B, and to which a revolving motion is imparted by a crank, C, in the direction of the arrow marked near said crank in Figs. 2 and 3. If desired, motion can be imparted to the shaft A by a belt and pulley, or by other well-known mechanical means.

On the shaft A is firmly mounted the primary friction-wheel D, and with this friction-wheel is combined the secondary friction-wheel E, which is mounted in a movable bearing—such, for instance, as a stud or pin, *e*, secured in an arm, *f*, which swings on a pivot, *g*, and is subjected to the action of a spring, *h*. It is obvious, however, that the construction of this movable bearing can be modified in various ways, which will readily suggest themselves to every skillful mechanic. By the action of the spring *h* the secondary friction-wheel E is pressed up against the primary friction-wheel D, so that if the latter revolves in the direction of arrow 1, Figs. 2 and 3, the former revolves in the direction of arrow 2, Fig. 2.

F is a shaft, to which a revolving motion is to be imparted, and which I have termed the "driven shaft." This shaft is mounted in a movable bearing, which, in the example shown in the drawings, consists of an arm, *i*, that swings on a pivot, *j*, but which may be constructed in any suitable manner. On the driven shaft is mounted a pulley, G, and the movable bearing is subjected to the action of a spring, *k*, which has a tendency to keep said pulley out of contact with the friction-wheels D E, as shown in Fig. 1.

With the movable bearing of the driven shaft is combined a contact mechanism, which, in the example shown in the drawings, consists of two toggle-levers, *l m*, and a treadle, H, but the construction of which may be modified, as will readily suggest itself to every skillful mechanic. When the treadle H is depressed with a comparatively light force the pulley G is brought in contact with the secondary friction-wheel E, and a revolving motion is imparted to it in the direction of the arrow 3, Fig. 2; but if the treadle is depressed with great force the pulley G is brought in contact with the primary friction-wheel D, the secondary friction-wheel E being raised out of contact with said primary friction-wheel, (see Fig. 3,) and a revolving motion is imparted to the pulley in the direction of arrow 4, or in a direction opposite to that imparted to it by the secondary friction-wheel. By reducing the force bearing upon the treadle the secondary friction-wheel is again permitted to come in contact with the primary friction-wheel, and the motion of the driven shaft is again reversed. This mechanism is applicable to a large number of machines where it is desirable to reverse the motion of a shaft at will, and one of its great advantages consists in the fact that by increasing or decreasing the diameter of the secondary friction-wheel the speed of the reverse motion can be increased or decreased at pleasure; and, furthermore, all danger of injury by this reverse motion is avoided, since, if the mechanism attached to the driven shaft during its reverse motion meets with an undue resistance, the secondary friction-wheel rides up on the pulley and the motion stops, while at the same time a powerful forward motion can be imparted to the mechanism attached to the driven shaft. If, for instance, the follower of a press is connected to and moved by the driven shaft, such follower will receive a powerful motion in one direction, and its motion can be reversed with great ease and rapidity.

My device can also be constructed in the manner shown in Figs. 4, 5, and 6, where the secondary friction-wheel E is mounted in a fixed bearing and constantly in contact with the primary friction-wheel D. The pulley G is placed between the two friction-wheels and retained out of contact with either of them by springs $k$, or any other suitable means. The contact mechanism is so constructed that the pulley can be brought in contact either with the primary or with the secondary friction-wheel.

Instead of making the bearing of the shaft F of the pulley G movable, this bearing can be made stationary, and the bearings of the shafts of the pulleys D E can be made movable, in which case the contact mechanism will be brought to act on the journal-boxes of the shafts A and $e$.

What I claim as new, and desire to secure by Letters Patent, is—

1. In a mechanical movement, the combination of a pulley journaled in a movable bearing and mechanism for controlling the movements of said bearing with two friction-wheels arranged on shafts, one of which rotates continuously in one direction, said pulley being adapted to be alternately brought into contact with one or the other of the friction-wheels to reverse the direction in which the pulley rotates, substantially as described.

2. In a mechanical movement, the combination of a pulley having its bearings in a pivoted laterally-swinging arm and mechanism for controlling the swinging movements of said arm with two friction-wheels arranged on shafts, one of which friction-wheels rotates continuously in one direction, and the other being acted on by a spring or weight, substantially as described, whereby said pulley can be alternately brought into contact with one or the other of the friction-wheels to reverse the direction in which the pulley rotates, as set forth.

In testimony whereof I have hereunto set my hand and seal in the presence of two subscribing witnesses.

LEVI E. DICKINSON. [L. S.]

Witnesses:
P. CANAVAN,
E. A. THOMPSON.